US009791068B2

(12) United States Patent
Mathies et al.

(10) Patent No.: US 9,791,068 B2
(45) Date of Patent: Oct. 17, 2017

(54) LIFTING GATE POLYDIMETHYLSILOXANE MICROVALVES AND PUMPS FOR MICROFLUIDIC CONTROL

(71) Applicant: The Regents of the University of California, Oakland, CA (US)

(72) Inventors: Richard A. Mathies, Moraga, CA (US); Jungkyu Kim, Albany, CA (US); Erik C. Jensen, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/155,183

(22) Filed: Jan. 14, 2014

(65) Prior Publication Data
US 2014/0197339 A1    Jul. 17, 2014

Related U.S. Application Data

(60) Provisional application No. 61/752,933, filed on Jan. 15, 2013.

(51) Int. Cl.
*F04B 19/00* (2006.01)
*F16K 99/00* (2006.01)

(52) U.S. Cl.
CPC ........ *F16K 99/0015* (2013.01); *F04B 19/006* (2013.01); *F16K 99/0005* (2013.01);
(Continued)

(58) Field of Classification Search
None
See application file for complete search history.

(56) References Cited

U.S. PATENT DOCUMENTS 6,568,286 B1 *  5/2003  Cabuz ............... F04B 43/043
                                                73/863.31
6,612,535 B1 *  9/2003  Tai ..................... B81C 1/00158
                                                251/11

(Continued)

OTHER PUBLICATIONS

Grover, et al. 2006. "Development and multiplexed control of latching pneumatic valves using microfluidic logical structures," *Lab Chip* 6, pp. 623-631.

(Continued)

*Primary Examiner* — John Fox
(74) *Attorney, Agent, or Firm* — Weaver Austin Villeneuve & Sampson LLP

(57) ABSTRACT

The present disclosure relates to method, system for microfluidic control. One or more embodiments of the disclosure relate to pneumatically actuated "lifting gate" microvalves and pumps. In some embodiments, a microfluidic control module is provided, which comprises a plurality of pneumatic channels and a plurality of lifting gate valves configured to be detachably affixed to a substrate. The plurality of lifting gate valves are aligned with at least one fluidic channel on the substrate when affixed to the substrate. Each of the valves comprises: a pneumatic layer, a fluidic layer, and a pneumatic displacement chamber between the pneumatic layer and the fluidic layer. The fluidic layer has a first side facing the pneumatic layer and a second side facing away from the pneumatic layer, wherein the second side has a protruding gate configured to obstruct a flow of the fluidic channel when the fluidic layer is at a resting state.

20 Claims, 8 Drawing Sheets

(52) U.S. Cl.
CPC .... *F16K 99/0059* (2013.01); *F16K 2099/008* (2013.01); *F16K 2099/0094* (2013.01)

(56) References Cited

U.S. PATENT DOCUMENTS

| | | | | |
|---|---|---|---|---|
| 6,619,311 | B2* | 9/2003 | O'Connor | B01L 3/5025 137/109 |
| 7,195,670 | B2* | 3/2007 | Hansen | B01L 3/502738 117/201 |
| 7,766,033 | B2* | 8/2010 | Mathies | F16K 99/0001 137/297 |
| 8,016,260 | B2* | 9/2011 | Mukaddam | F04B 43/02 251/331 |
| 8,444,933 | B2* | 5/2013 | Kim | B01L 3/502738 422/505 |
| 8,584,703 | B2* | 11/2013 | Kobrin | B01F 11/0071 137/597 |
| 8,609,039 | B2* | 12/2013 | Zhou | B01L 3/5025 422/500 |
| 8,616,227 | B1* | 12/2013 | Facer | B01F 5/02 137/109 |

OTHER PUBLICATIONS

Jensen, et al. 2010. "Microvalve Enabled Digital Microfluidic Systems for High Performance Biochemical and Genetic Analysis," *JALA* 15, pp. 455-463.

Kim, et al. 2012. "Lifting Gate Polydimethylsiloxane Microvalves and Pumps for Microfluidic Control," *Analytical Chemistry* 84, pp. 2067-2071.

Kim et al. 2013. "Universal Microfluidic Automaton for Autonomous Sample Processing: Application to the Mars Organic Analyzer," *Anal. Chem.* 85:7682-7688.

Mohan, et al. 2011. "Design considerations for elastomeric normally closed microfluidic valves" *Sens. Act. B* 160, pp. 1216-1223.

Oh, et al. 2006. "A review of microvalves," *J. Micromech. Microeng.* 16, pp. R13-R39.

Schudel et al. 2009. "Microfluidic chip for combinatorial mixing and screening of assays," *Lab Chip* 9:1676-1680.

Kim et al., "Pneumatically actuated microvalve circuits for programmable automation of chemical and biochemical analysis," Royal Society of Chemistry, Published on Feb. 3, 2016. Downloaded by University of Utah on Nov. 2, 2016 16:24-.06., 2016, 8 pages.

* cited by examiner

A

B

_(1)_

LIFTING GATE POLYDIMETHYLSILOXANE MICROVALVES AND PUMPS FOR MICROFLUIDIC CONTROL

STATEMENT OF GOVERNMENT SUPPORT

This invention was made with government support under ES016115 awarded by the National Institutes of Health. The government has certain rights in the invention.

FIELD OF INVENTION

The present disclosure relates to methods and systems for microfluidic control involving a plurality of lifting gate microvalves and pumps. In some embodiments, the lifting gate microvalves are made of polydimethylsiloxane (PDMS).

BACKGROUND

Microvalves and pumps are essential components for many microfluidic bioanalysis applications including genomic analysis, pathogen detection, immunoassays, high-throughput cellular analysis and automated sample processing. Mechanisms for microvalve actuation including electrical, thermal, chemical and pneumatic means have been developed and utilized for sample delivery and flow rate control. See, e.g. Oh, K. W., Ahn, C. H., J. Micromech. Microeng. 2006, 16, R13-R39. Pneumatically-actuated microvalves and pumps have been most widely employed for assay automation with large scale integration because this fabrication is simple and inexpensive. But the efficiency, portability, and reusability of pneumatically-actuated microvalves and pumps all leave room for improvement.

SUMMARY

One aspect of the current disclosure provides pneumatically actuated "lifting gate" microvalves and pumps. One or more implementations of the disclosure provide microfluidic pumps with high pumping efficiency, portability, and interoperability across a wide range of lab-on-a-chip substrates.

One or more implementations of the current disclosure provide a microfluidic control module including: a plurality of pneumatic channels, each channel configured to deliver positive and/or negative pressure to a pneumatic displacement chamber; and a plurality of lifting gate valves configured to be detachably affixed to a substrate, the valves being aligned with at least one fluidic channel on the substrate when affixed to the substrate. Each of the valves may include: (1) a pneumatic layer, (2) a fluidic layer having a first side facing the pneumatic layer and a second side facing away from the pneumatic layer, wherein the second side has a protruding gate configured to obstruct a flow of the fluidic channel when the valves are attached to the substrate and the fluidic layer is at a resting state, and (3) a pneumatic displacement chamber between the pneumatic layer and the fluidic layer, wherein the pneumatic displacement chamber is configured to use a negative opening pressure delivered by one of the pneumatic channels to actuate the fluidic layer, thereby lifting the protruding gate away from the substrate to allow the flow of the fluid channel.

In one or more embodiments, the pneumatic displacement chamber is configured to use a positive closing pressure delivered by the pneumatic channel to return or maintain the fluidic layer to or at a resting state, thereby closing the protruding gate to obstruct the flow of the fluidic channel.

In one or more of the embodiments above, the pneumatic layer further includes one or more pneumatic ports through which one or more pneumatic channels deliver pressure to the pneumatic displacement chamber.

One or more of the embodiments above can be implemented as a multilayer microfluidic control module, the module including a bottom layer of valves as the plurality of lifting gate valves described above; and one or more additional layers of valves that are stacked over the bottom layer of valves. In one or more implementations, the fluidic layer of a valve in the additional layers of valves is configured to be affixed to the pneumatic layer of another valve positioned immediately thereunder. In one or more implementations, the pneumatic layer of the other valve positioned immediately thereunder includes a fluidic channel.

In one or more of the implementations above, the pneumatic layer is made of PDMS. In one or more implementations, the fluidic layer is made of PDMS. In one or more implementations, the substrate is made of materials selected from the group including: glass, plastic, silicon, metal, polyester terephthalate, or combinations thereof.

In one or more implementations, the microfluidic control module above can be configured as one or more pumps, wherein each pump includes three or more lifting gate valves in series including an input valve, a displacement valve, and an outlet valve. Each lifting gate valve is activated by a different pneumatic channel and the three lifting gate valves are independently activated in sequence designed to move fluid through the pump. In one or more implementations, one or more of the pumps is used to form a multi-directional fluidic router, said router including one central displacement valve in fluid communication with one or more input valves and one or more outlet valves.

In one or more implementations, actuating the fluidic layer forms a fluid reservoir in the fluidic channel. In one or more implementations, the microfluidic control module above is configured as a mixer, wherein the input valves and output valves of the pump are each connected to admission channels to form a mixer wherein mixing is accomplished by actuating the three or more valves in a sequence to pump the fluid in a loop or back and forth. In one or more implementations, the input valves and output valves of the pump are each connected to admission channels to form a mixer wherein mixing is accomplished by moving a fluid between two reservoirs. In one or more implementations, reservoirs in each of a plurality of the fluidic channels are connected by a fluidic bus. In one or more implementations, the reservoir in the fluidic channel has one or more inputs and is operable as a reactor.

In one or more implementations, one pneumatic channel actuates a plurality of valves that control fluid flow in a plurality of different fluidic channels. In one or more implementations, different pneumatic channels each actuate a valve that controls fluid flow in different fluidic channels.

In one or more implementations, a fluidic layer containing a gate structure and a pneumatic layer are fabricated by soft-lithography in PDMS and bonded permanently with an oxygen plasma treatment. The microvalve structures are then reversibly bonded to a featureless glass or plastic substrate to form hybrid glass-PDMS and plastic-PDMS microchannel structures. In one or more embodiments of the disclosure, the break-through pressures of the microvalve increase linearly up to 65 kPa as the closing pressure increases. The pumping capability of these structures ranges from the nanoliter to microliter scale depending on the number of cycles and closing pressure employed. In one or more implementations, the micropump structures exhibit at least 60%, more preferably at least 70%, and most preferably at least 80% pumping efficiency from flow rate measurements. In one embodiment, the micropump structures has up to 86.2% pumping efficiency from flow rate measurements. The utility of these structures for integrated sample processing is demonstrated by performing an automated immunoassay. The lifting gate valve and pump structures of the current disclosure enable facile integration of complex microfluidic control systems with a wide range of lab-on-a-chip substrates.

BRIEF DESCRIPTION OF THE DRAWINGS

To further clarify various aspects of some embodiments of the present disclosure, a more particular description will be rendered by reference to specific embodiments thereof which are illustrated in the appended drawings. It is appreciated that these drawings depict only typical embodiments and are therefore not to be considered limiting of its scope. The disclosure will be described and explained with additional specificity and detail through the use of the accompanying drawings.

DETAILED DESCRIPTION

Figure 1:
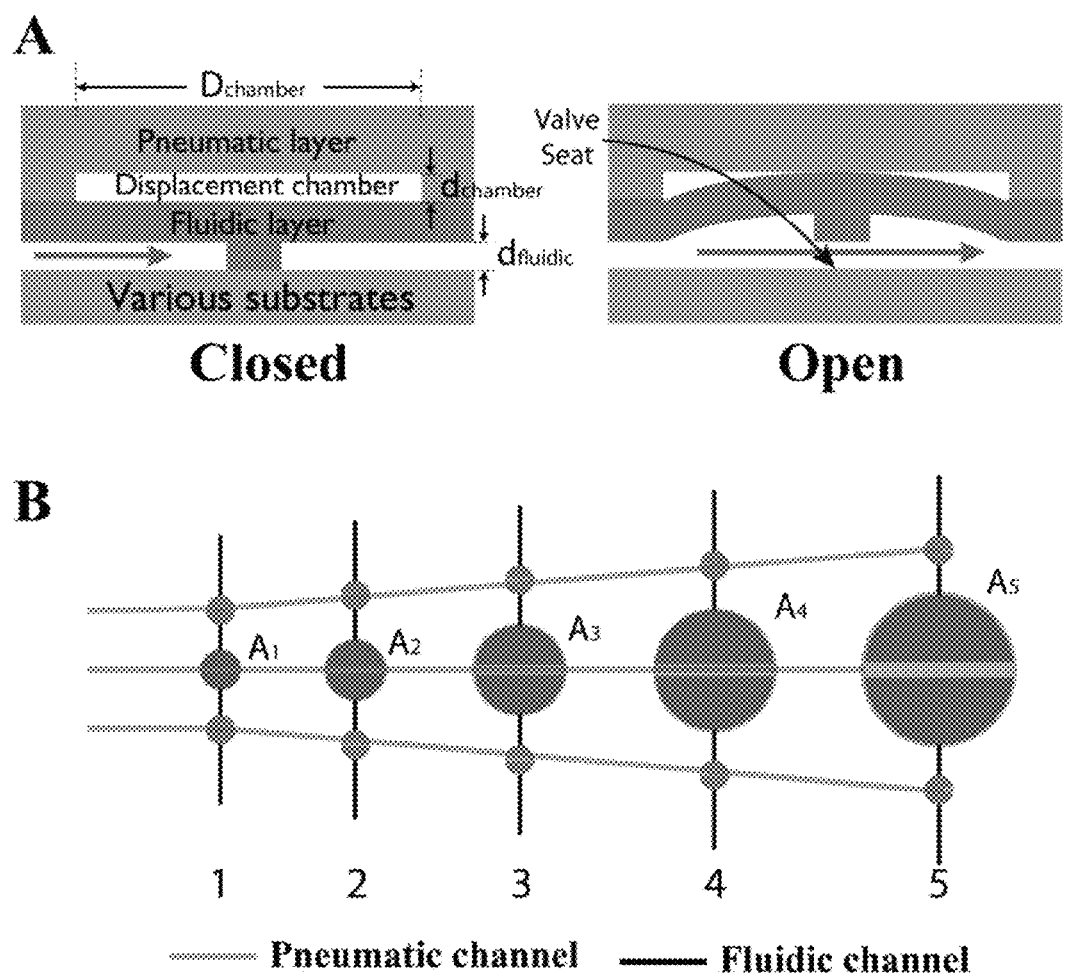
FIG. 1A shows cross-sectional view of normally closed PDMS "lifting gate" microvalve. Displacement chambers formed in a PDMS pneumatic layer are aligned and permanently bonded with a PDMS fluidic layer containing gate structures. The opposite side of the fluidic layer can be bonded to a variety of substrates to form hybrid channels. Application of a vacuum to the displacement chamber pulls the gate structure away from the substrate, filling and allowing fluid flow through the microvalve.
FIG. 1B illustrates layout of micropumps formed from three PDMS gate lifting microvalves in series used for testing. Ai (i=1~5) presents a half of fluidic chamber area.

Some of the most frequently used pneumatically-actuated microvalves and pumps employ glass-PDMS-glass hybrid or PMMA-PDMS-PMMA structures with featureless membrane layers. See, e.g., Jensen, et al., JALA, 2010, 15, 455-463; and Grover et al., Lab Chip, 2006, 6, 623-631. In this disclosure, applicants demonstrate and characterize the integrated pumping capabilities of lifting gate microvalves such as those shown in FIG. 1A. The utility of these structures for facile integration with patterned, solid substrates is described herein. In some embodiments as shown in FIG. 1A, a pump is formed using a linear array of three microvalves in series with cyclic actuation. These unique structures enable direct integration with a broad range of substrates, thereby reducing microfabrication complexity.

To demonstrate the utility of these microvalves and pumps, applicants perform an automated microparticle based immunoassay using a polyester terephthalate (PET) substrate. These microvalves and pumps are capable of highly efficient, automated fluidic transport and address several limitations of multilayer PDMS valves and monolithic membrane valves described above.

One aspect of the current disclosure provides pneumatically actuated "lifting gate" microvalves and pumps. One or more implementations of the disclosure provide microfluidic pumps with high pumping efficiency, portability, and interoperability across a wide range of lab-on-a-chip substrates.

One or more implementations of the current disclosure provides a microfluidic control module including: a plurality of pneumatic channels, each channel configured to deliver positive and/or negative pressure to a pneumatic displacement chamber; and a plurality of lifting gate valves configured to be detachably affixed to a substrate, the valves being aligned with at least one fluidic channel on the substrate when affixed to the substrate. Each of the valves may include: (1) a pneumatic layer, (2) a fluidic layer having a first side facing the pneumatic layer and a second side facing away from the pneumatic layer, wherein the second side has a protruding gate configured to obstruct a flow of the fluidic channel when the valves are attached to the substrate and the fluidic layer is at a resting state, and (3) a pneumatic displacement chamber between the pneumatic layer and the fluidic layer, wherein the pneumatic displacement chamber is configured to use a negative opening pressure delivered by one of the pneumatic channels to actuate the fluidic layer, thereby lifting the protruding gate away from the substrate to allow the flow of the fluid channel.

One or more of the embodiments above can be implemented as a multilayer microfluidic control module, the module including a bottom layer of valves as the plurality of lifting gate valves described above; and one or more additional layers of valves that are stacked over the bottom layer of valves. In one or more implementations, the fluidic layer of a valve in the additional layers of valves is configured to be affixed to the pneumatic layer of another valve positioned immediately thereunder. In one or more implementations, the pneumatic layer of the other valve positioned immediately thereunder includes a fluidic channel.

Materials and Methods

Figure 2:
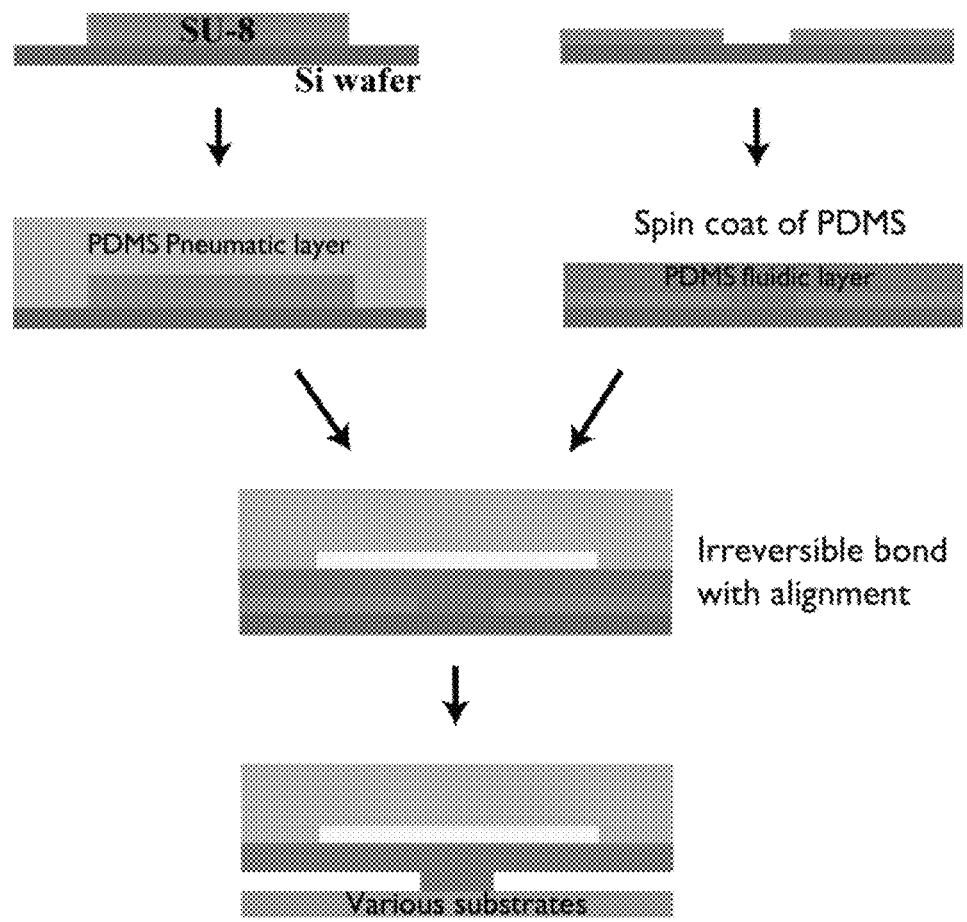
FIG. 2 illustrates the fabrication process for PDMS lifting gate microvalves. The fluidic and pneumatic layers are created using a soft-lithography method. For the pneumatic layer, uncured PDMS is poured onto a SU8 mold to create a ~4 mm thick layer. For the channel layer, uncured PDMS was spun onto a mold at 350 rpm to achieve ~200 μm thick films with the channel structures. The two layers are bonded together after oxygen plasma treatment and then attached to a selected substrate.

Fabrication of lifting gate microvalves and pumps. A soft-lithography method using SU-8 molds was used to prepare channel features in PDMS layers. FIG. 2 presents the steps employed for device fabrication and assembly. For fluidic and pneumatic layers, SU-8 molds were fabricated to obtain a 25 µm and 60 µm feature height, respectively. After silanizing the SU-8 molds using chemical vapor deposition (CVD), the mold for the fluidic layer was spin-coated with a 10 (base material):1 (curing agent) ratio of PDMS (Dow Corning, USA) and thermally cured at 65° C.

To determine flow rates gravimetrically, the methods described by Grover et al. were employed. PEEK tubing was attached to the outlet and inlet of a micropump. The inlet tubing was placed into an open source of water. The outlet tubing was placed in direct contact with approximately 10 mL H$_2$O in a scintillation vial. This scintillation vial was placed onto a scale (Mettler PM1200). The scintillation vial was covered with parafilm with small holes punctured to prevent build-up of pressure. Prior to analysis, baseline measurements were made to determine the stability of the system. Over the time course of the pumping experiments, there was no drift in the data due to evaporation or hydrodynamic flow.

Figure 3:
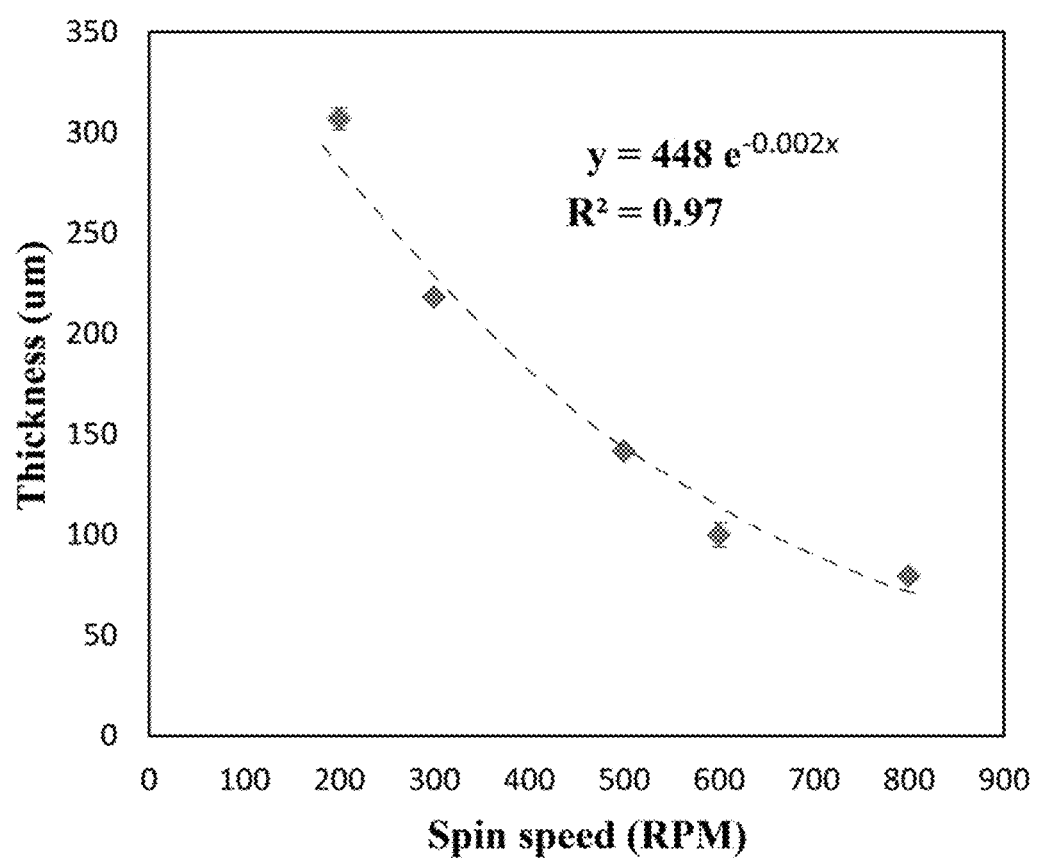
FIG. 3 illustrates volume pumped per cycle as a function of actuation time and closing pressure for pumps 1-4.

PDMS thickness as a function of angular velocity was characterized to fabricate this system. FIG. 3. In this study, the fluidic mold was spun with 350 rpm to fabricate the 200 µm thick PDMS membrane structure. For the pneumatic layer mold, PDMS was poured on the mold and cured on a 65° C. hotplate for one hour. Holes were punched in the PDMS replica for pneumatic connections and then it was permanently bonded to a PDMS channel layer using oxygen plasma activation (PETS Inc., USA). To evaluate the valving and pumping efficiency, the microvalves and pump structures were then bonded to the glass substrate by UV-ozone treatment.

Operation and Characterization.

Lifting gate microvalves and pumps were operated by applying a vacuum or pressure to inlets on the pneumatic layer (FIG. 1B). The valves are actuated by a series of off-chip solenoid controllers using a vacuum pump (−87 kPa) and various closing pressures. Prior to operation of the devices, all microvalves were opened in the absence of fluid to reduce the bonding between glass and PDMS to increase the ease of actuation. To measure the break-through pressure of the microvalve, inlet and outlet valves were opened and the middle valve was held closed with various pressures (5~60 kPa). By varying the fluidic pressure on the inlet side, applicants determined the critical pressure required to initiate flow through the 2.25 mm diameter valve. To evaluate the pumping capability, five different sized pumps were used to characterize the dependence of displacement chamber volume on pump performance. As described previously, the volume pumped per cycle depends on the volume of the center valve (manifold valve) in a three valve pump. The theoretical maximum volume pumped per cycle (Vmax) also depends to a lesser extent on the volume of the fluidic region on the downstream side of the gate since the PDMS can be deflected into this region. Taking this into account, Vmax was calculated as:

$$V_{max} = \frac{1}{4}\pi D_{chamber}^2 d_{manifold} + A_i d_{fluidic}$$

where dmanifold, Dchamber, dfluidic and Ai are the depth of the manifold valve displacement chamber, diameter of the manifold valve displacement chamber, depth of fluidic channel, and a half area of fluidic chamber, respectively (FIG. 1 and Table 1).

TABLE 1

Summary of design parameters and $V_{max}$ for lifting gate microfluidic pumps.

| $D_{chamber}$ (mm) | $d_{manifold}$ (µm) | $d_{fluidic}$ (µm) | $A_i$ (mm$^2$) | $V_{max}$ (nL) |
|---|---|---|---|---|
| 1.00 | 60 | 25 | 0.14 | 55.67 |
| 1.50 | 60 | 25 | 0.32 | 106 |
| 2.25 | 60 | 25 | 0.72 | 238.6 |
| 3.00 | 60 | 25 | 1.29 | 424.1 |
| 3.75 | 60 | 25 | 2.01 | 783.2 |

Each of the input and output valves has an identical diameter (Dchamber=750 µm). Standard 5-step pumping programs 19 were used and volumetric flow rates were adjusted by changing the actuation time and closing pressure during the pumping programs.

Automated Microparticle Label Immunoassay.

To demonstrate the utility of the lifting-gate microvalves for integration and reusability with plastic substrates, a device was designed and fabricated as described above. In the first step of the assay, 100 µg/mL of streptavidin (Sigma Aldrich, USA) was non-specifically adsorbed onto the polyester terephthalate (PET) film (Rogers Corp., Ill., USA) for 2 hours in a 37° C. oven prior to assembly of the device. After UV ozone treatment of the PDMS layer, it was attached to the streptavidin treated polyester terephthalate (PET) substrate. One percent bovine serum albumin (BSA), biotinylated capture antibodies (Anti-mouse IgG-F$_c$ specific from Thermo-Fisher Scientific Inc., USA), target sample (Mouse IgG, Thermo-Fisher Scientific Inc., USA), anti-mouse IgG conjugated microparticles (Abcam Inc. and MyOne Invitrogen Inc., USA) and washing buffer were selected via bus valves and pumped to the reactor to perform the immunoassay. To remove the unbound beads, hydrodynamic washing was performed for 2 minutes with a flow rate of 2.2 µL/min. After collecting the images using a bright field microscope (Nikon Eclipse E800), the number of beads was counted using a segmentation algorithm in a Matlab program. To reuse the microfluidic control system, the solid substrate is peeled away from the fluidic layers, and the fluidic device is rinsed with IPA and DI water sequentially. For the next assay, a new solid substrate is bonded as described above.

Results

Figure 4:
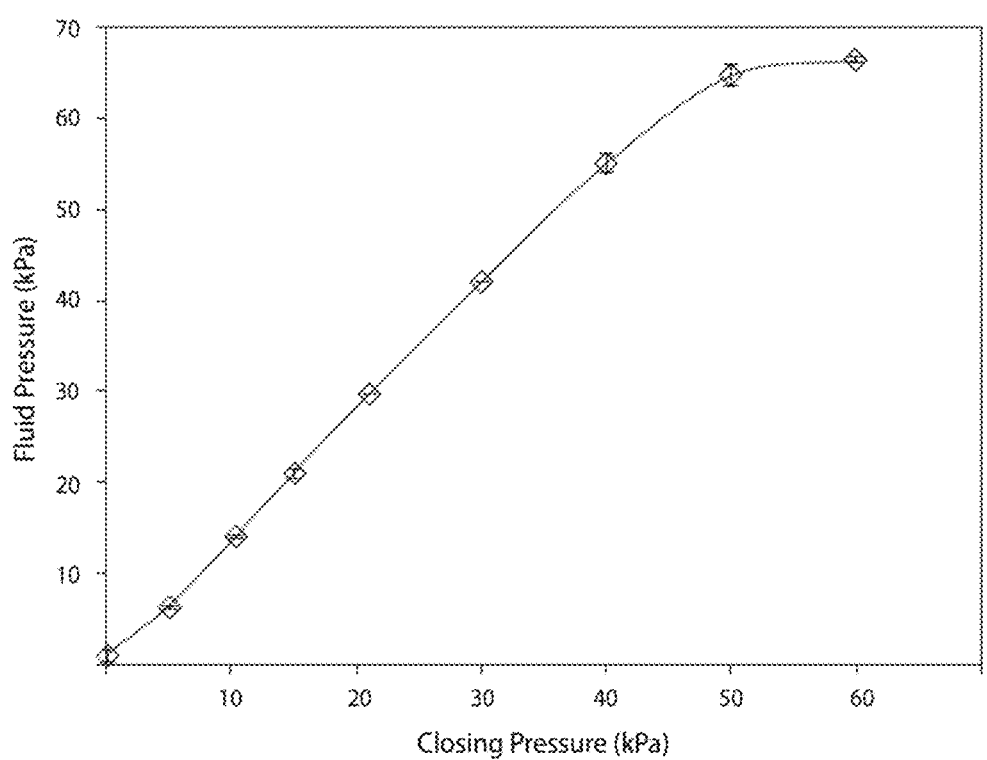
FIG. 4 shows the fluid pressure required to initiate flow through a valve being held at the indicated manifold (closing) pressure with a 2.25 mm diameter microvalve (N=4).

Lifting gate microvalves and pumps were developed and characterized for break-through pressure and pumping efficiency. FIG. 4 presents a characterization of the fluid flow through a lifting gate microvalve. The closing pressure required to hold off an applied fluidic pressure increases linearly with the applied pressure. The maximum breakthrough pressure observed was 65 kPa with a 50 kPa closing pressure.

Figure 5:
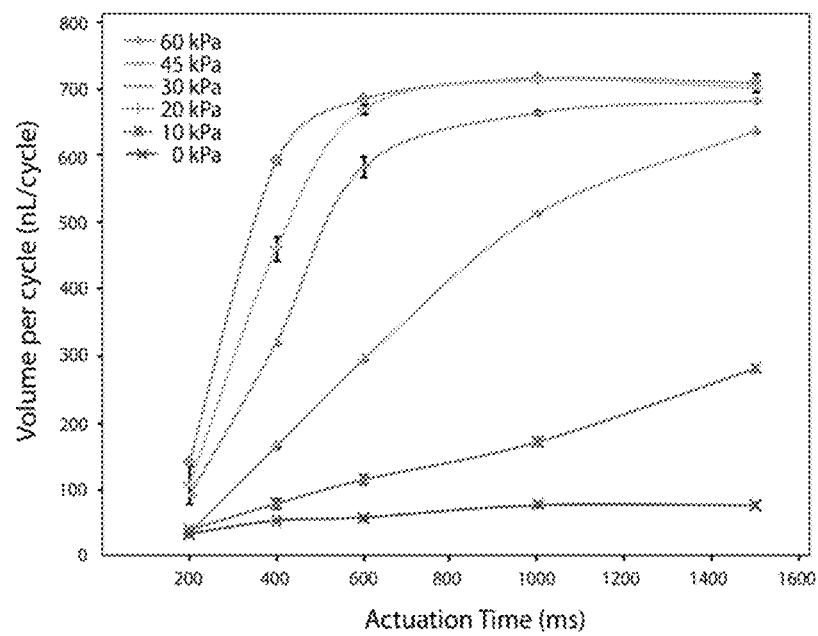
FIG. 5A shows volume pumped per cycle as a function of actuation time and closing pressure for pump 5 (3.75 mm diameter) in FIG. 1B. Valve actuation vacuum was −87 kPa and pressure was varied from 0 to 60 kPa.
FIG. 5B shows maximum volume pumped per cycle as a function of diaphragm chamber volume for pumps 1 through 5 shown in FIG. 1A. Valve actuation and pressure were −87 and 30 kPa, respectively.
Figure 5:
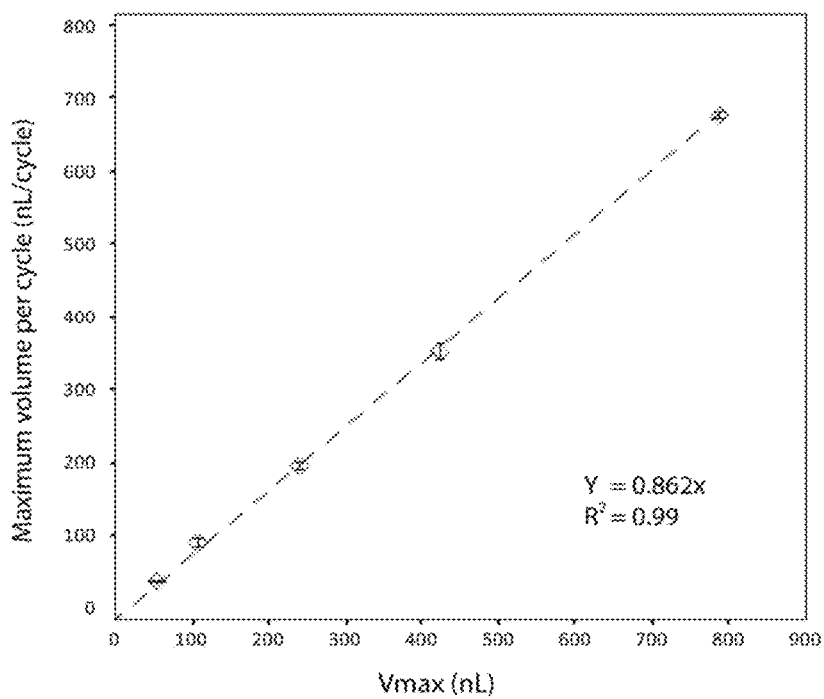
Figure 6:
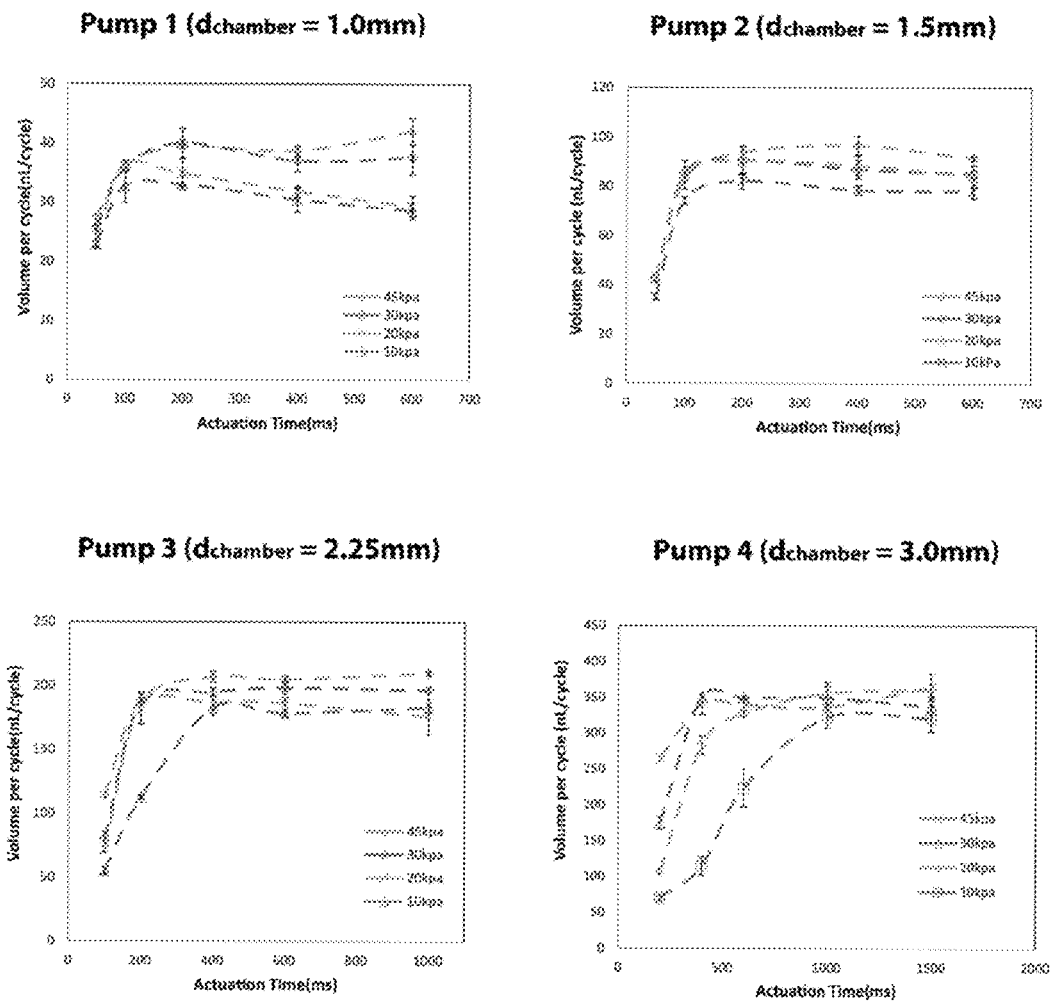
FIG. 6 shows volume pumped per cycle as a function of actuation time and closing pressure for pumps 1-4.

Pumping rates (nL/s) as a function of closing pressure and actuation time were measured gravimetrically (see supporting information). The actuation time is the length of time each valve remains opened or closed for a given step of the program. The volume pumped per cycle was then calculated using the measured pumping rate. FIG. 5A shows volume pumped per cycle as a function of actuation time and closing pressure for the pump containing a 3.75 mm diameter diaphragm valve (pump 5 in FIG. 1B). At fixed actuation times, the volume pumped per cycle increases with increasing closing pressure. It can be inferred that low closing pressure results in some backflow in the pump while high closing pressure increases the efficiency of fluid transfer between valves. When the closing pressure approached 45 kPa and the actuation time exceeded 600 ms, the volume pumped per cycle reaches a maximum level of 680±2.4 nL (86.2±0.72% Vmax). This maximum efficiency is slightly higher than that previously reported for monolithic membrane valves (82% Vmax).19 At fixed closing pressures greater than 10 kPa, the volume pumped per cycle increased with increasing actuation time and approached the maximum efficiency since sufficient actuation time is required for complete filling or emptying of the diaphragm valve. As the closing pressure increased, the actuation time required for maximum efficiency decreased as expected. In addition, the diameter of the diaphragm valve was found to affect the pumping efficiency in terms of volume pumped per cycle. As the diameter of diaphragm valve decreases, the actuation time required for maximum efficiency decreases (FIG. 6). Smaller sized microvalves have sufficient time to transfer the liquid while closing the gate structure under lower closing pressure. As expected, a longer actuation time is necessary to achieve maximum efficiency for larger microvalves at low closing pressure.

The maximum volume pumped per cycle was determined for each pump by varying the actuation time at 30 kPa closing pressure. The maximum volume pumped per cycle increases linearly with the volume of the diaphragm displacement chamber. Regardless of diaphragm valve size, the maximum volume pumped per cycle was found to be 86.2% Vmax (FIG. 5B). Using this relationship, applicants can design the required chamber size for precise metering of nanoliter scale volumes.

Figure 7:
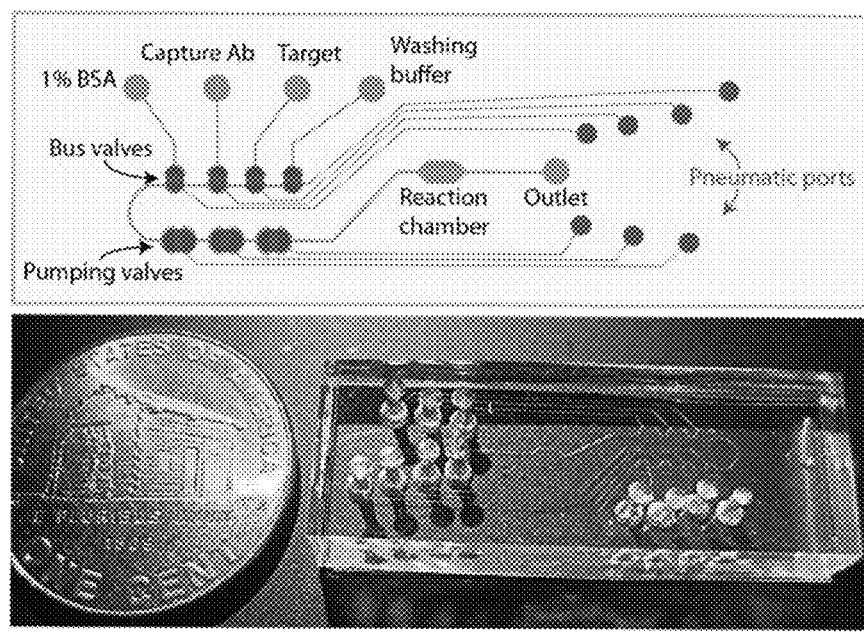
FIG. 7A shows automated microparticle based immunoassay with lifting gate microvalves and pumps. After UV ozone treatment of the PDMS layer, it was manually bonded to a polyester terephthalate (PET) substrate treated with streptavidin. Four bus valves were used for selecting buffer and reagents while flow through the reactor was controlled by the pumping valves.
FIG. 7B shows results of the automated microparticle label immunoassay for 1 μg/mL mouse IgG and blank samples. The number of beads specifically bound to surfaces was counted from optical micrographs (N=3).
Figure 7:
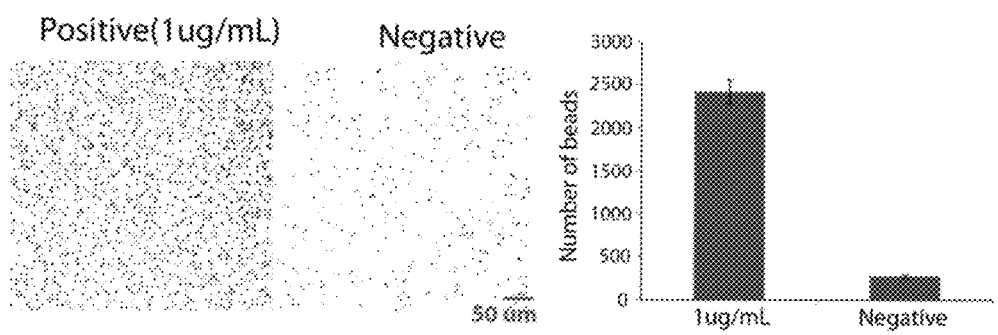

To demonstrate the utility of the lifting gate microvalves and pumps, applicants fabricated a programmable sample processing system with an integrated bioreactor for solid phase capture immunoassays (FIG. 7). In this example, the lifting gate microvalves were used to automate each of the steps in a microparticle label immunoassay for mouse IgG detection. Using streptavidin functionalized PET as a solid support, biotinylated anti-mouse Ig-Fc, 1% BSA, mouse IgG and anti-mouse IgG conjugated microparticle were pumped sequentially through reaction chamber. Washing of unbound microparticles was performed hydrodynamically by pumping buffer through the reaction chamber. FIG. 6B shows the results of the 15 minute assay for a negative and 1 µg/mL mouse IgG target concentration using a single device. Using this device, a signal to noise of 7.39±0.37 was achieved. These results indicated that the lifting gate microvalves are useful for automated immunoassay applications with significantly reduced fabrication complexity. The increase in bead density for the positive sample can also be observed with the naked eye, enabling rapid and portable biomarker analysis. Since lifting gate microvalves can be directly bonded to a variety of substrates, they can be used as a control system for other microdevices using this modular assembly. Applicants previously demonstrated an automated, microfluidic microparticle labeled immunoassay platform using normally closed monolithic membrane valves.10 This microfluidic platform required additional layers for integration and more complex fabrication processes such as glass etching, thin PDMS film formation, and drilling via-holes in glass. The lifting gate microfluidic control system has significantly reduced fabrication complexity, facile integration with plastic substrates, and high-performance bioassay capabilities.

Applicants have demonstrated that pneumatically actuated lifting gate microvalves and pumps can be directly integrated with a wide range of substrates. The use of closing pressures in the range of 30-45 kPa significantly reduces the hysteresis previously reported for similar microvalves (See, Mohan, R., Schudel, B. R., Desai, A. V., Yearsley, J. D., Apblett, C. A., Kenis, P. J. A. Sens. Act. B 2011, 160, 1216-1223.) and enables high-efficiency, integrated pumping operations. These structures also enable separate fabrication of the microfluidic platform and functional surface, thereby simplifying the process for device fabrication and assembly. The modular design and assembly of such systems provides an appropriate format for a disposable microfluidic sample processing system and/or a point-of-care diagnostic device. Furthermore, by adjusting the height of the lifting gate, one can fabricate both normally-closed and normally-open microvalves. This ability is especially useful for the filtration of particles such as cells by precisely controlling the actuation pressure.

Figure 8:
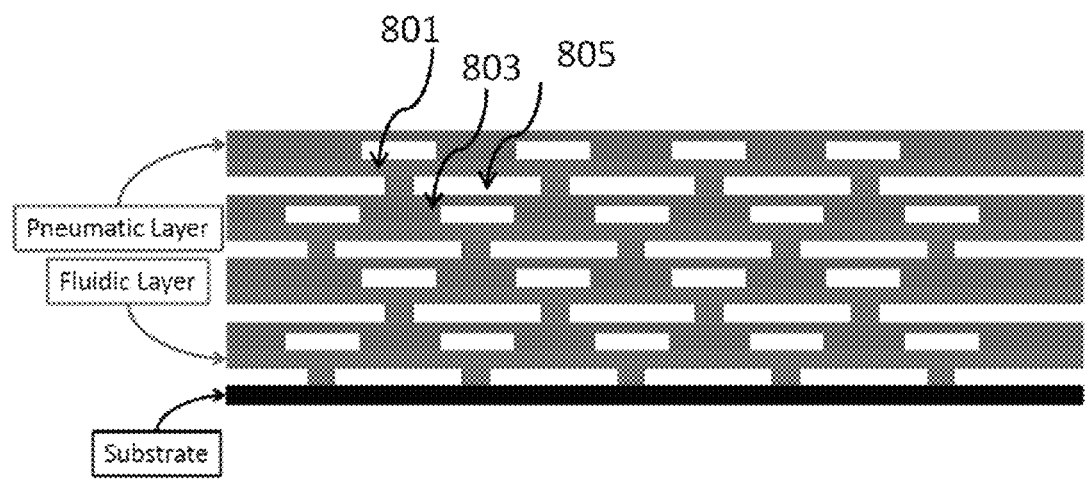
FIG. 8 illustrates a diagram of the side view of a multilayer microfluidic pump according to an implementation of the current disclosure.

One or more embodiments can be implemented as a multilayer microfluidic control module. FIG. 8 illustrates a diagram of the side view of a multilayer microfluidic pump as an example. The multilayer microfluidic pump includes a bottom layer of valves as the plurality of lifting gate valves, and three additional layers of valves that are stacked over the bottom layer of valves, forming a four-layer pump. Each layer of pumps include a fluidic layer and a pneumatic layer. As in the example here, the fluidic layer 801 of a valve in the additional layers of valves is configured to be affixed to the pneumatic layer 803 of another valve positioned immediately thereunder. In one or more implementations, the pneumatic layer 803 of the other valve positioned immediately thereunder includes a fluidic channel 805.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:
1. A microfluidic control module comprising:
(a) a substrate layer having a first side and a second side;
(b) a first fluidic layer positioned adjacent to the second side of the substrate layer, wherein
   a first side of the first fluidic layer faces the substrate layer and a second side of the first fluidic layer faces away from the substrate layer,
   one or more first fluidic channels are formed between the second side of the substrate layer and the first side of the first fluidic layer, and
   the first side of the first fluidic layer has a first plurality of protruding gates that are positioned to align with the one or more first fluidic channels and are configured to obstruct a flow of the one or more first fluidic channels when the first fluidic layer is at a resting state;
(c) a first pneumatic layer positioned adjacent to the second side of the first fluidic layer, wherein:
   a first side of the first pneumatic layer faces the first fluidic layer and a second side of the first pneumatic layer faces away from the first fluidic layer, a first plurality of pneumatic displacement chambers are formed between the second side of the first fluidic layer and the first side of the first pneumatic layer, and the substrate layer, the first fluidic layer and the first pneumatic layer are configured to provide a first plurality of lifting gate valves configured as one or more first pumps;

(d) a second fluidic layer positioned adjacent to the second side of the first pneumatic layer, wherein a first side of the second fluidic layer faces the first pneumatic layer and a second side of the second fluidic layer faces away from the first pneumatic layer, one or more second fluidic channels are formed between the second side of the first pneumatic layer and the first side of the second fluidic layer, and the first side of the second fluidic layer has a second plurality of protruding gates that are positioned to align with the one or more second fluidic channels and are configured to obstruct a flow of the one or more second fluidic channels when the second fluidic layer is at a resting state; and (e) a second pneumatic layer positioned adjacent to the second side of the second fluidic layer, wherein:

a first side of the second pneumatic layer faces the second fluidic layer and a second side of the second pneumatic layer faces away from the second fluidic layer, a second plurality of pneumatic displacement chambers are formed between the second side of the second fluidic layer and the first side of the second pneumatic layer, and the first pneumatic layer, the second fluidic layer and the second pneumatic layer are configured to provide a second plurality of lifting gate valves configured as one or more second pumps.

2. The microfluidic control module as in claim 1, wherein the first and second pluralities of pneumatic displacement chambers are configured to use a positive closing pressure to return or maintain the first and second fluidic layers respectively to or at a resting state.

3. The microfluidic control module as in claim 2, wherein a break-through pressure of the first and second fluidic channels increases linearly up to 65 kPa as the positive closing pressure increases.

4. The microfluidic control module as in claim 1, wherein the first and second pneumatic layers comprise one or more pneumatic ports through which one or more pneumatic channels deliver pressure to the first and second pluralities of pneumatic displacement chambers.

5. The microfluidic control module as in claim 1, wherein the first and second pneumatic layers are made of PDMS.

6. The microfluidic control module as in claim 1, wherein the first and second fluidic layers are made of PDMS.

7. The microfluidic control module as in claim 1, wherein the substrate layer is made of materials selected from the group consisting of: glass, plastic, silicon, polyester terephthalate, metal, or combinations thereof.

8. The microfluidic control module as in claim 1, wherein each pump of the first pumps and the second pumps comprises three or more lifting gate valves in series comprising an input valve, a displacement valve, and an outlet valve, wherein each lifting gate valve is actuated by a different pneumatic channel and the three lifting gate valves are independently actuated in sequence designed to move fluid through the pump.

9. The microfluidic control module as in claim 8 wherein one or more of the first pumps and the second pumps are used to form a multi-directional fluidic router, said router comprising one central displacement valve in fluid communication with one or more input valves and one or more outlet valves.

10. The microfluidic control module as in claim 8 configured as a mixer, wherein the input valves and the outlet valve are each connected to admission channels to form a mixer wherein mixing is accomplished by actuating the three or more valves in a sequence to pump the fluid in a loop or back and forth.

11. The microfluidic control module as in claim 1 wherein actuating the first fluidic layer or the second fluidic layer forms a fluid reservoirs in the first fluidic channels or the second fluidic channels, respectively.

12. The microfluidic control module as in claim 11 configured as a mixer, wherein input valves and output valves of a pump of the mixer are each connected to admission channels to form a mixer wherein mixing is accomplished by moving a fluid between two reservoirs.

13. The microfluidic control module as in claim 11, wherein two or more fluidic reservoirs are connected by a fluidic bus.

14. The microfluidic control module as in claim 11, wherein at least one of the fluidic reservoirs has one or more inputs and is operable as a reactor.

15. The microfluidic control module as in claim 4, wherein at least one of the pneumatic channels is configured to actuate a plurality of valves that control fluid flow in a plurality of different fluidic channels.

16. The microfluidic control module as in claim 1, wherein the module has at least 60% pumping efficiency from flow rate measurements.

17. The microfluidic control module as in claim 1, wherein the module has at least 80% pumping efficiency from flow rate measurements.

18. The microfluidic control module of claim 1, further comprising: at least one additional pair of fluidic and pneumatic layers that are positioned adjacent to the second side of the second pneumatic layer, wherein each additional pair of fluidic and pneumatic layers and a pneumatic layer adjacent to the fluidic layer of the additional pair provides a plurality of lifting gate valves configured as one or more pumps.

19. The microfluidic control module of claim 1, further comprising one or more first pneumatic channels between the second side of the first fluidic layer and the first side of the first pneumatic layer, wherein the one or more first pneumatic channels are configured to deliver a negative pressure to the first plurality of pneumatic displacement chambers to activate the first fluidic layer, thereby lifting the first plurality of protruding gates away from the substrate to allow the flow in the one or more first fluidic channels.

20. The microfluidic control module of claim 1, further comprising one or more second pneumatic channels between the second side of the second fluidic layer and the first side of the second pneumatic layer, wherein the one or more second pneumatic channels are configured to deliver a negative pressure to the second plurality of pneumatic displacement chambers to activate the second fluidic layer, thereby lifting the second plurality of protruding gates away from the first pneumatic layer to allow the flow of the one or more second fluidic channels.

* * * * *